United States Patent Office 2,731,473
Patented Jan. 17, 1956

2,731,473

NEW PYRAZOLONE DERIVATIVES

William Taub, Rehovoth, Israel, assignor to J. R. Geigy A. G., Basel, Switzerland, a Swiss firm No Drawing. Application August 9, 1954, Serial No. 448,735

Claims priority, application Switzerland August 21, 1953

4 Claims. (Cl. 260—310)

The present invention is concerned with new 3-substituted 1-phenyl-5-pyrazolones as well as with the production of these compounds. 1-phenyl-3-cyclopropyl-5-pyrazolones of the general formula:

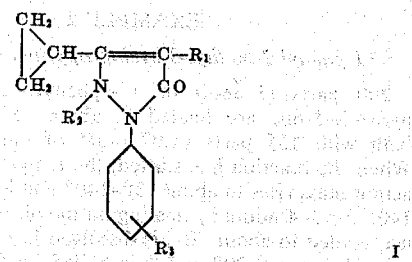

I wherein $R_1$ represents hydrogen, a low molecular aliphatic hydrocarbon radical, the amino group or an alkylamino or dialkylamino group,
$R_2$ represents a low molecular aliphatic hydrocarbon radical,
$R_3$ represents hydrogen, a low molecular alkyl group or an alkoxy group, are new. It has been found that these compounds have an excellent analgetic, antipyretic and antiphlogistic action and, in addition, some of them are valuable starting products for the production of other compounds of pharmacological interest.

The new compounds can be produced by condensing a reactive derivative of a cyclopropane carbonyl acetic acid of the general formula:

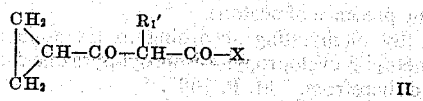

II with an aryl hydrazine of the general formula:

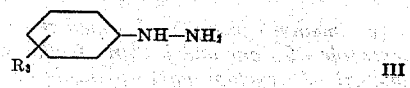

III wherein $R_1'$ represents hydrogen or a low molecular aliphatic hydrocarbon radical,
X represents a radical which is split off in the reaction, such as, for example, an alkoxy radical, the amino or phenylamino group, and
$R_3$ has the meaning given above, to form a compound of the general formula:

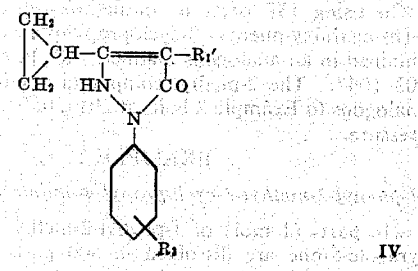

IV

If desired, then compounds wherein $R_1'$ represents hydrogen can be converted into the corresponding 4-alkyl compounds by condensation and simultaneous or later reduction with a low molecular aliphatic oxo compound. After or instead of the introduction of an alkyl radical $R_1$, an alkyl or alkenyl radical $R_2$ is introduced by treatment with an alkylating agent and if desired, compounds in which $R_1'$ represents hydrogen can be converted by methods known per se into the corresponding 4-amino, 4-alkylamino or 4-dialkylamino compounds.

The condensation of cyclopropane carbonyl acetic acid esters of the general Formula II with aryl hydrazines of the general Formula III to form the pyrazolone derivatives of the general Formula IV can be performed in a manner analogous to the condensation of acetoacetic acid esters with aryl hydrazines.

If cyclopropane carbonyl acetic acid derivatives of the general formula:

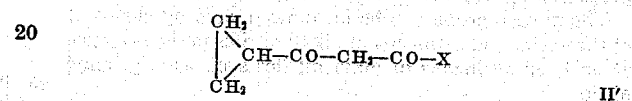

II' i. e. compounds in which $R_1'$ is hydrogen, are used as starting materials and are reacted with aryl hydrazines of the general Formula III and then an alkyl or alkenyl radical $R_2$ is introduced, then compounds, unsubstituted in the 4-position, of the general formula:

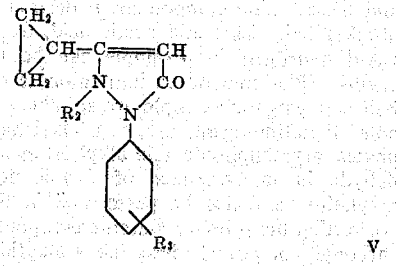

V are obtained.

As cyclopropane carbonyl acetic acid esters of the general Formula II, cyclopropane carbonyl acetic acid ethyl and methyl esters as well as α-cyclopropane carbonyl-propionic acid ethyl ester (=α-cyclopropane carbonyl methyl acetic acid ethyl ester), -butyric acid ethyl ester, -valeric acid ethyl ester, isovaleric acid ethyl ester, -caproic acid ethyl ester and -allyl acetic acid ethyl ester can be used as starting materials. They are produced easily by reacting the corresponding aliphatic halogen compounds with the sodium compound of the cyclopropane carbonyl acetic acid ethyl ester. In addition to phenyl hydrazine, e. g. 2-methyl, 3-methyl, 4-methyl, 2.4-dimethyl, 2.5-dimethyl, 4-ethyl, 4-tert. butyl, 2-methoxy, 3-methoxy, 4-methoxy, 2-ethoxy and 4-ethoxy-phenyl hydrazine, can be used as aryl hydrazines of the general Formula III.

The reaction of the two components often occurs already at room temperature if a suitable solvent is added at the same time, e. g. methanol, ethanol or ethanol containing water. The reaction can be completed by boiling the solvent under reflux.

On completion of the closure of the ring, if desired an alkyl radical $R_1$ can be introduced by condensing a compound of the general Formula IV with a low molecular aliphatic oxo compound, preferably a ketone, such as, e. g. acetone, methyl ethyl ketone or diethyl ketone and then hydrogenating either simultaneously or later.

The alkyl or alkenyl radical $R_2$ is introduced by methods known per se by reacting an alkylation agent such as e. g. dimethyl or diethyl sulphate, methyl iodide, ethyl, propyl or allyl bromide, in the presence or absence of an inert organic solvent, with a condensation product of the general Formula IV, and the primary quaternary reaction product obtained is converted into the desired 1-aryl-2-alkyl-3-cyclopropyl-pyrazole-5-one by heating with caustic soda solution. The tertiary compound can also be produced directly however, by treating a compound of the general Formula IV with an alkylating agent in the presence of an acid binding agent, e. g. with dimethyl sulphate or diethyl sulphate in caustic soda solution. The two modifications of the process differ, therefore, not in the type of reactants used but only in the order in which they are used; thus first the alkylating agent and then a basic substance or both at the same time are reacted with a compound of the general Formula IV.

To introduce basic radicals in the 4-position, compounds according to Formula V can be converted by methods known per se into their 4-nitroso- or 4-nitro-compounds and these latter can be converted into the 4-amino compounds or into the 4-alkylamino compounds or into the 4-dialkylamino compounds by reduction, if desired in the presence of an aliphatic ketone or aldehyde. If desired any hydrogen atoms present in the amino or alkylamino group can be replaced by alkyl radicals.

The nitroso group can be introduced, e. g. by means of nitrous acid, i. e. by means of alkali nitrites in the presence of acid, or by means of alkyl nitrites such as e. g. amyl nitrite.

Below are given in more detail the most important modifications of the process defined above after the nitroso or nitro group has been introduced.

The 4-nitroso or 4-nitro compounds can be converted into the 4-amino compounds by means of reducing agents and these amino compounds, if desired can be mono- or di-alkylated. Zinc and acetic acid, or catalytically activated hydrogen for example can be used as reducing agents. Platinum or barium sulphate or nickel and cobalt catalysts for example are suitable as catalysts. Suitable alkylating agents are, e. g. alkyl halides, dialkyl sulphates, aryl sulphonic acid alkyl esters as well as formaldehyde in the presence of formic acid. The monoalkylation can also be performed in two steps by first converting the primary 4-amino compounds with aliphatic carbonyl compounds into the 4-alkylidene amino compounds and then treating these latter with reducing agents.

If sodium bisulphite is used as reducing agent for the 4-nitroso compound, then the 4-sulphamino compounds are obtained directly as reaction products and these can be mono- or dialkylated directly; the sulphamino group is then split off in another reaction, i. e. if this has not already occurred in the reaction with the alkylating agent.

If the 4-nitroso or 4-nitro derivatives are reduced in the presence of aliphatic aldehydes, the 4-dimethylamino compounds for example are easily obtained if the reduction is performed with catalytically activated hydrogen in the presence of formaldehyde. If another aliphatic aldehyde or a ketone is used, both monoalkylamino and also dialkylamino compounds can be obtained.

A further method for the production of compounds of the general Formula I wherein R₁ represents an amino group, an alkylamino group or a dialkylamino group, consists in converting the 1-aryl-3-cyclopropyl-5-pyrazolones of the general Formula V into the 4-bromo derivatives of the general formula:

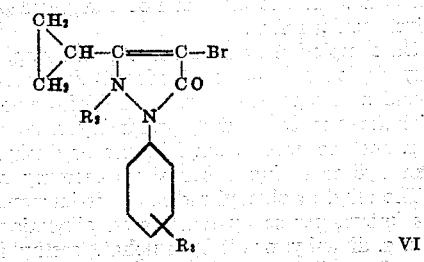

VI by reacting them with molar amounts of bromine and treating the reaction products with water. In this formula R₂ and R₃ have the meanings given above. These bromo derivatives are then converted into basic compounds corresponding to Formula I.

The following examples serve to further illustrate the invention. Parts are given as parts by weight and their relationship to parts by volume is as that of grammes to cubic centimetres. The temperatures are given in degrees centigrade.

EXAMPLE 1

*1-phenyl-3-cyclopropyl-pyrazole-5-one*

156 parts of cyclopropane carbonyl acetic acid ethyl ester, produced in per se conventional manner, are diluted with 100 parts by volume of 80% alcohol, and 108 parts (1 mol) of phenyl hydrazine are added whereupon heat is quickly generated. After heating on the water bath for 3–4 hours, the reaction mixture is allowed to cool, whereupon the 1-phenyl-3-cyclopropyl-pyrazole-5-one formed crystallises out. After recrystallisation from methanol, the product melts at 115°.

EXAMPLE 2

*1-phenyl-2-methyl-3-cyclopropyl-pyrazole-5-one*

200 parts (1 mol) of 1 - phenyl - 3 - cyclopropyl-pyrazole-5-one are heated to about 95° on the water bath with 135 parts (1.07 mol) of dimethyl sulphate. When the reaction has started, the temperature of the reaction mass rises to about 130–140° and it is kept at about 140° for 3–4 hours by heating on the oil bath. The product, cooled to about 70°, is dissolved in 400 parts by volume of water at 70° and then boiled for 6–8 hours. 400 parts by volume of NaOH 33% are added to the cooled solution and the whole is heated at 95° for 4 hours while stirring. After cooling, the solidified product is taken up in benzene and after distilling under reduced pressure if necessary, it is recrystallised from isopropanol. M. P. 115°.

EXAMPLE 3

*1-phenyl-2-methyl-3cyclopropyl-4-isopropyl-pyrazole-5-one*

If in the process according to Example 1, cyclopropane carbonyl α-isopropyl acetic acid ester is used instead of cyclopropane carbonyl acetic acid ester, then 1-phenyl-3-cyclopropyl-4-isopropyl-pyrazole-5-one is obtained.

The same compound is obtained by hydrogenating condensation of 1-phenyl-3-cyclopropyl-pyrazole-5-one in the presence of acetone.

By methylating according to Example 2, 1-phenyl-2-methyl-3-cyclopropyl-4-isoproyl-pyrazole-5-one is obtained therefrom. M. P. 108°.

EXAMPLE 4

*1 - (p - methyl - phenyl) - 2 - methyl - 3 - cyclopropyl-pyrazole - 5 - one and 1 - (m - methoxy - phenyl) - 2-methyl - 3 - cycloproppyl - pyrazole - 5 - one*

156 parts of cyclopropane carbonyl acetic acid ethyl ester and 122 parts of p-methylphenyl hydrazine in 100 parts by volume of 96% alcohol are boiled under reflux for 6 hours. On cooling, 1-(p-methyl-phenyl)-3-cyclopropyl-pyrazole-5-one crystallises out. After rescrystallisation from ethanol it melts at 140–141°.

The 2-methyl compound is obtained by methylation analogous to Example 2. B. P.₀.₀₆ 185–186°.

On using 138 parts of m-methoxy-phenyl hydrazine, 1-(m-methoxy-phenyl)-3-cyclopropyl-pyrazole-5-one is obtained in an analogous manner. M. P. (from ethanol) 103–104°. The 2-methyl compound obtained therefrom analogous to Example 2 boils at 201–205° under 0.01 mm. pressure.

EXAMPLE 5

*1-phenyl-2-methyl-3-cyclopropyl-4-amino-pyrazole-5-one*

214 parts (1 mol) of 1-phenyl-2-methyl-3-cyclopropyl-pyrazole-5-one are dissolved in 500 parts of water and 700 parts by volume of acetic acid and the nitroso group is introduced at —5° with 70 parts of sodium nitrite dissolved in 140 parts of water.

After filtering under suction and washing with distilled water, the nitroso compound is obtained which melts after recrystallization from diluted alcohol at 195°.

243 parts (1 mol) of 1-phenyl-2-methyl-3-cyclopropyl-4-nitroso-pyrazole-5-one are added to a solution of 350 parts of sodium bisulphite (100%) and 125 parts of caustic soda solution in 1200 parts of water. The temperature of the solution rises to about 50°. After about 4 hours, the solution is slowly brought to the boil and boiled for 45 minutes. After cooling, a solution of 75 parts of sulphuric acid in 150 parts of water are carefully added and the reaction liquid is brought to the boil under the introduction of air for 30 minutes. After cooling, the amine formed is liberated by an excess of 33% caustic soda solution and taken up in benzene. On evaporating off the solvent, the raw product is recrystallised from benzene-ligroin. M. P. 125°.

EXAMPLE 6

1-phenyl-2-methyl-3-cyclopropyl-4-dimethylamino-pyrazole-5-one 229 parts of 1-phenyl-2-methyl-3-cyclopropyl-4-amino-pyrazole-5-one are dissolved in 1000 parts of water and boiled under reflux for 8 hours with 250 parts by volume of 30% formaldehyde and 345 parts of 100% formic acid. After cooling, an excess of 33% caustic soda solution is added to the solution and the amine formed is taken up in toluene.

After evaporating off the toluene, the raw product which remains is recrystallised from ligroin. M. P. 94°.

EXAMPLE 7

1-phenyl-3-cyclopropyl-4-allyl-pyrazole-5-one 10 parts by volume of alcohol (96%) are added to 19.8 parts of cyclopropane carbonyl-α-allyl acetic acid ethyl ester (B. P.$_{25}$ 135°, produced from the sodium compound of cyclopropane carbonyl acetic acid ethyl ester and allyl bromide) and 10.8 parts of phenyl hydrazine and the whole is boiled under reflux for 6 hours. The alcohol is then evaporated off and the residue is distilled in a high vacuum. 1-phenyl-3-cyclopropyl-4-allyl-pyrazole-5-one passes over at 148–151° under 0.006 mm. pressure.

1-phenyl-2-methyl-3-cyclopropyl-4-allyl-pyrazole-5 - one is obtained therefrom by methylation analogous to Example 2.

EXAMPLE 8

1-phenyl-2-allyl-3-cyclopropyl-pyrazole-5-one 20 parts of 1-phenyl-3-cyclopropyl-pyrazole-5-one are heated for 5 hours at 150° in a sealed tube with 13.5 parts of allyl bromide and 200 parts by volume of benzene. After cooling, the substance which is insoluble in benzene is taken up in water, the aqueous solution is made alkaline and the precipitated product is taken up in ether.

After evaporating off the ether, the residue is distilled off in high vacuum.

What I claim is:

1. A pyrazolone derivative of the general formula:

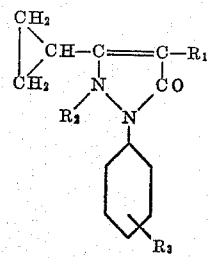

wherein $R_1$ represents a member selected from the group consisting of hydrogen, a lower aliphatic hydrocarbon radical, the amino group, the amino group substituted by lower alkyl radicals, $R_2$ represents a lower aliphatic hydrocarbon radical and $R_3$ represents a member selected from the group consisting of hydrogen, an alkyl group and an alkoxy group, alkyl being lower alkyl.

2. The 1-phenyl-2-methyl-3-cyclopropyl-pyrazole-5-one.
3. The 1-phenyl-2-methyl-3-cyclopropyl-4-isopropyl-pyrazole-5-one.
4. The 1-phenyl-2-methyl-3-cyclopropyl-4-dimethylamino-pyrazole-5-one.

References Cited in the file of this patent

FOREIGN PATENTS

| 122,466 | Switzerland | Sept. 16, 1927 |
| 125,132 | Switzerland | Apr. 2, 1928 |

OTHER REFERENCES

Wahl et al.: Chem. Abstracts, vol. 3, p. 167 (1909).